United States Patent
Chun et al.

(10) Patent No.: US 9,301,288 B2
(45) Date of Patent: Mar. 29, 2016

(54) METHOD AND APPARATUS FOR TRANSMITTING FEEDBACK INFORMATION IN WIRELESS COMMUNICATION SYSTEM

(75) Inventors: Jin Young Chun, Anyang-si (KR); Ki Seon Ryu, Anyang-si (KR); Jin Sam Kwak, Anyang-si (KR); Young Soo Yuk, Anyang-si (KR); Wook Bong Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 13/814,164

(22) PCT Filed: Aug. 9, 2011

(86) PCT No.: PCT/KR2011/005803
§ 371 (c)(1),
(2), (4) Date: Feb. 4, 2013

(87) PCT Pub. No.: WO2012/020971
PCT Pub. Date: Feb. 16, 2012

(65) Prior Publication Data
US 2013/0128767 A1  May 23, 2013

Related U.S. Application Data

(60) Provisional application No. 61/372,099, filed on Aug. 10, 2011.

(30) Foreign Application Priority Data

Apr. 25, 2011 (KR) .................. 10-2011-0038196

(51) Int. Cl.
*H04L 12/26* (2006.01)
*H04W 72/04* (2009.01)
*H04W 24/10* (2009.01)
*H04L 5/00* (2006.01)

(52) U.S. Cl.
CPC ......... *H04W 72/0413* (2013.01); *H04L 5/0098* (2013.01); *H04W 24/10* (2013.01); *H04L 5/001* (2013.01); *H04L 5/0053* (2013.01)

(58) Field of Classification Search
CPC .................................................. H04W 72/04
See application file for complete search history.

(56) References Cited

U.S. PATENT DOCUMENTS

2010/0172428 A1\* 7/2010 Pani et al. ...................... 375/262
2010/0272051 A1\* 10/2010 Fu et al. ......................... 370/329
2010/0296389 A1\* 11/2010 Khandekar et al. ........... 370/216

(Continued)

OTHER PUBLICATIONS

LG Electronics, "UL Feedback channel allocation for unpaired DL carrier in MC operation (16.2.8.2.8)", IEEE 802.16 Broadband Wireless Access Working Group, IEEE 802.16m-10/0153rl. Mar. 5, 2010.

(Continued)

*Primary Examiner* — Chi H Pham
*Assistant Examiner* — Fahmida Chowdhury
(74) *Attorney, Agent, or Firm* — Dentons US LLP

(57) ABSTRACT

A method and an apparatus for transmitting feedback of a mobile station (MS) in a wireless communication system supporting a multi-carrier operation are provided. The method includes transmitting feedback information to a base station, and in this case, the feedback information is transmitted through a MAC control message and the feedback information includes carrier information of an activation carrier related to the MAC control message.

10 Claims, 6 Drawing Sheets

(56) References Cited

U.S. PATENT DOCUMENTS

| | | | |
|---|---|---|---|
| 2011/0141926 A1* | 6/2011 | Damnjanovic et al. | 370/252 |
| 2011/0261704 A1* | 10/2011 | Etemad | 370/252 |
| 2012/0147831 A1* | 6/2012 | Golitschek | 370/329 |
| 2013/0182685 A1* | 7/2013 | Yu et al. | 370/336 |

OTHER PUBLICATIONS

InterDigital Communications, "Proposed Changes Related to Carrier Management Procedures in Multicarrier Systems (15.2.8.2.11)", IEEE 802.16 Broadband Wireless Access Working Group, IEEE 802.16m-10/0400r1, Jul. 9, 2010.

Samsung Electronics et al., "Feedback mechanism for asymmetric carrier aggregation (16.2.8.1)", IEEE 802.16 Broadband Wireless Access Working Group, IEEE 802.16m-10/0281r1, Mar. 16, 2010.

ETRI et al., "Proposed Text Changes of the AAI_SCD Message w.r.t. UL Feedback Information for Carrier Aggregation (15.2.3.30)", IEEE 802.16 Broadband Wireless Access Work Group, IEEE 802.16m-10/0533r2, May 6, 2010.

* cited by examiner

METHOD AND APPARATUS FOR TRANSMITTING FEEDBACK INFORMATION IN WIRELESS COMMUNICATION SYSTEM

This application is a 35 U.S.C. §371 National Stage Entry of International Application No. PCT/KR2011/005803, filed Aug. 9, 2011 and claims the benefit of U.S. Provisional Application No. 61/372,099, filed Aug. 10, 2010, and Korean Application No: 10-2011-0038196, filed Apr. 25, 2011, all of which are incorporated by reference in their entirety herein.

TECHNICAL FIELD

The present invention relates to wireless communication and, more particularly, to a method and apparatus for transmitting feedback information in a wireless communication system.

BACKGROUND ART

IEEE (and Electronics Engineers) 802.16e standards have been adapted in the name of 'WMAN-OFDMA TDD' as sixth standards for IMT (International Mobile Telecommunication)-2000 in ITU (International Telecommunication Union-affiliated ITU-R (ITU-Radio communication sector) in 2007. ITU-R is preparing an IMT-Advanced system as next-generation 4G mobile communication standards after IMT-2000. IEEE 802.16 WG (Working Group) determined to promote an 802.16m project to aim at creating amendment standards of the existing IEEE 802.16e, as standards for the IMT-Advanced system in late 2006. IEEE 802.16m standards are required to satisfy the advanced requirements for the IMT-Advanced system while maintaining the compatibility with the 802.16e standard-based Mobile WiMAX system.

A next-generation wireless communication system may support a multi-carrier mode. The multi-carrier mode refers to a mode supporting a plurality of carriers for a single mobile station (MS) to allow for broadband communication. The conventional wireless communication system supports only a single carrier. In the multi-carrier mode, each carrier is designed to meet basic requirements of operating an independent system. That is, each independently operable band in the multi-carrier mode can be defined as a carrier.

The next-generation wireless communication system such as 3GPP LTE-A or IEEE 802.16m supports broadband by aggregating one or more carriers to extend bandwidth up to 20 MHz or greater. For example, when a single carrier corresponds to a bandwidth of 5 MHz, four carriers are aggregated to support a maximum 20 MHz bandwidth. In this manner, a plurality of carriers may be used in the multi-carrier mode.

Meanwhile, the MS can transmit feedback information to a base station (BS) via uplink. Feedback of the MS may be performed according to a BS request or may be driven by an event. According to the conventional standard (e.g., IEEE 802.16m D7), the BS transmits a control message for requesting feedback to the MS through a downlink carrier. Then, the MS transmits the feedback information to the BS through an uplink carrier linked to the downlink carrier. In this respect, according to the conventional standard, the BS should transmit the control message only through a particular downlink carrier. This scheme may not cause a problem in a system using a single carrier, but may be problematic in a system using multiple carriers. That is, to which of carriers the control message transmitted through the particular downlink carrier is related is unclear.

Also, according to the conventional standard, it is stipulated that feedback information should be transmitted only through a particular carrier in driving the feedback of the MS through an event. Thus, in the multi-carrier mode, to which of carriers the feedback information is related is unclear.

Therefore, a method and apparatus for transmitting feedback information of the MS in the wireless communication system supporting the multi-carrier mode are required.

SUMMARY OF INVENTION

Technical Problem

Therefore, an object of the present invention is to provide a method and apparatus for transmitting feedback information in a wireless communication system.

Solution to Problem

According to an aspect of the present invention, there is provided a method for transmitting feedback of a mobile station (MS) in a wireless communication system supporting a multi-carrier operation, including: transmitting feedback information to a base station (BS), wherein the feedback information is transmitted through a MAC (media access control) control message and the feedback information includes carrier information of an activation carrier related to the MAC control message.

The method may further include: receiving a downlink control message indicating a transmission of an uplink control message (i.e., a downlink control message instructing the MS to transmit an uplink control message) from the BS, wherein the downlink control message may include carrier information regarding a carrier related to the uplink control message to be transmitted by the MS.

The downlink control message may be transmitted through a MAC control message.

The downlink control message may be a message requesting the MS to measure at least one of an SINR (signal to interference plus noise ratio) and downlink interference with respect to a particular frequency partition and feed it back or a message requesting for the MS to report an uplink power state, over the carrier indicated by the carrier information included in the downlink message.

The downlink control message may be received through a primary carrier, wherein the primary carrier may be a stand-alone carrier by which the MS performs an initial network entry process or a network re-entry process.

The carrier information of the activation carrier related to the MAC control message may be a physical carrier index.

The physical carrier index may be comprised of 6 bits.

The MAC control message may be transmitted through the primary carrier, and primary carrier may be a stand-alone carrier by which the MS performs an initial network entry process or a network re-entry process.

The MAC control message may include information obtained by measuring at least one of the SINR (signal to interference plus noise ratio) and downlink interference with respect to a particular frequency partition, information regarding the reporting of the uplink power state, or feedback information according to a MIMO (multi input multi output) feedback mode.

The feedback information may be event-driven information transmitted when particular conditions are met.

The carrier information of the activation carrier related to the MAC control message may include a logical index of carriers allocated to the MS.

According to another aspect of the present invention, there is also provided an apparatus for transmitting feedback in a wireless communication system supporting a multi-carrier operation, including: an RF unit configured to transmit and receive a radio signal; and a processor connected to the RF unit, wherein the processor transmits feedback information to a base station (BS), and in this case, the feedback information is transmitted through a MAC (media access control) control message, and the feedback information may include carrier information of an activation carrier related to the MAC control message.

The processor may receive the downlink control message indicating the transmission of the uplink control message from the BS, and in this case, the downlink control message may include carrier information regarding a carrier related to the uplink control message to be transmitted by the MS.

The carrier information of the activation carrier related to the MAC control message may be a physical carrier index.

The physical carrier index may be comprised of 6 bits.

Advantageous Effects of Invention

According to exemplary embodiments of the present invention, in the wireless communication system supporting a multi-carrier mode, since the MS transmits feedback information including carrier information, to which of carriers the feedback information is related can be identified.

MODE FOR THE INVENTION

The following technique may be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. IEEE 802.16m is an advancement of IEEE 802.16e, providing backward compatibility with an IEEE 802.16e-based system. UTRA is a part of UMTS (Universal Mobile Telecommunications System). 3GPP (3rd Generation Partnership Project) LTE (long term evolution) is part of E-UMTS (Evolved UMTS) using E-UTRA, which employs OFDMA for downlink and SC-FDMA for uplink. LTE-A (Advanced) is an advancement of 3GPP LTE.

To clarify the explanation, description will be made largely based on the IEEE 802.16m, but the technical features of the present invention is not limited thereto.

Figure 1:
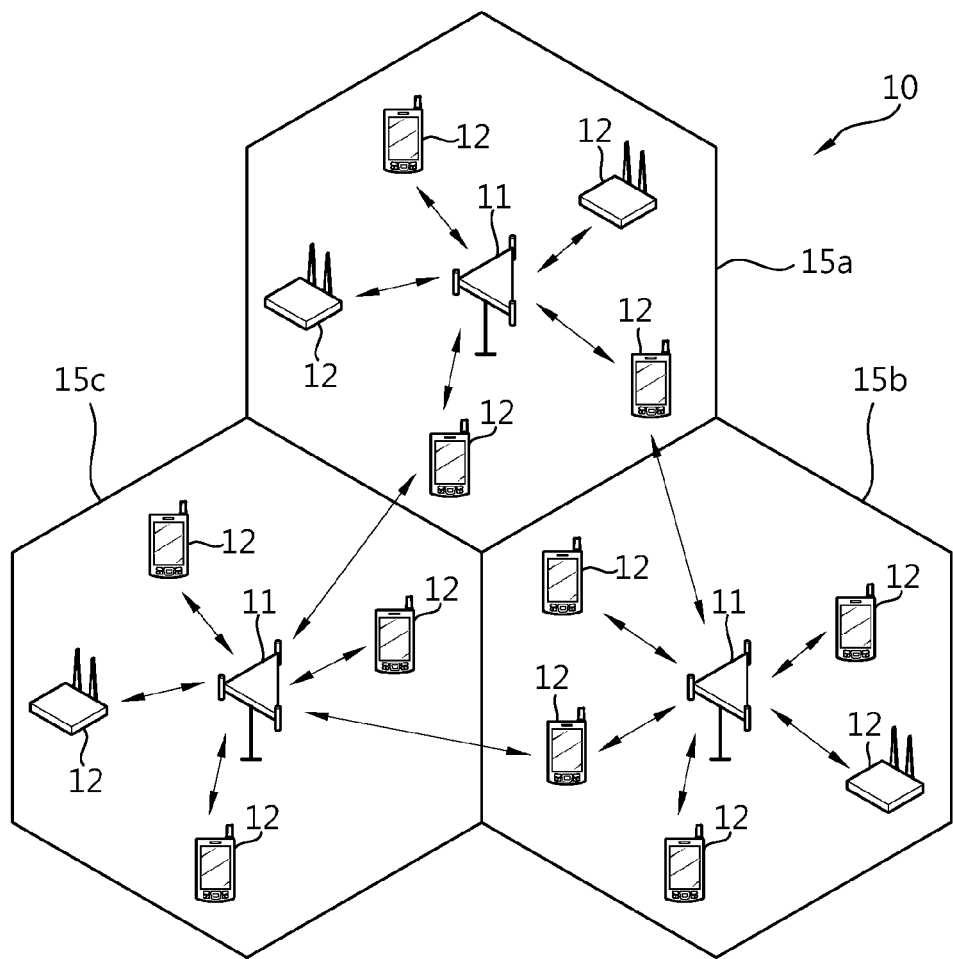
FIG. 1 illustrates a wireless communication system.

FIG. 1 illustrates a wireless communication system.

With reference to FIG. 1, the wireless communication system 10 includes at least one base station (BS). Each BS 11 provides a communication service to particular geo-graphical areas 15a, 15b, and 15c. The BS 11 generally refers to a fixed station that communicates with a mobile station (MS) 12 and may be called by other terminologies such as evolved-node B (eNB), base transceiver system (BTS), access point (AP), etc.

The MS 12 may be fixed or mobile and may be referred to by other names such as user equipment (UE), mobile terminal (MT), user terminal (UT), subscriber station (SS), wireless device, personal digital assistant (PDA), wireless modem, handheld device, etc.

This technique may be used for downlink or uplink. In general, downlink (DL) refers to communication from the BS 11 to the MS 12, and uplink (UL) refers to communication from the MS 12 to the BS 11. In downlink, a transmitter may be part of the BS 11 and a receiver may be part of the MS 12. In uplink, a transmitter may be part of the MS 12 and a receiver may be part of the BS 11.

Figure 2:
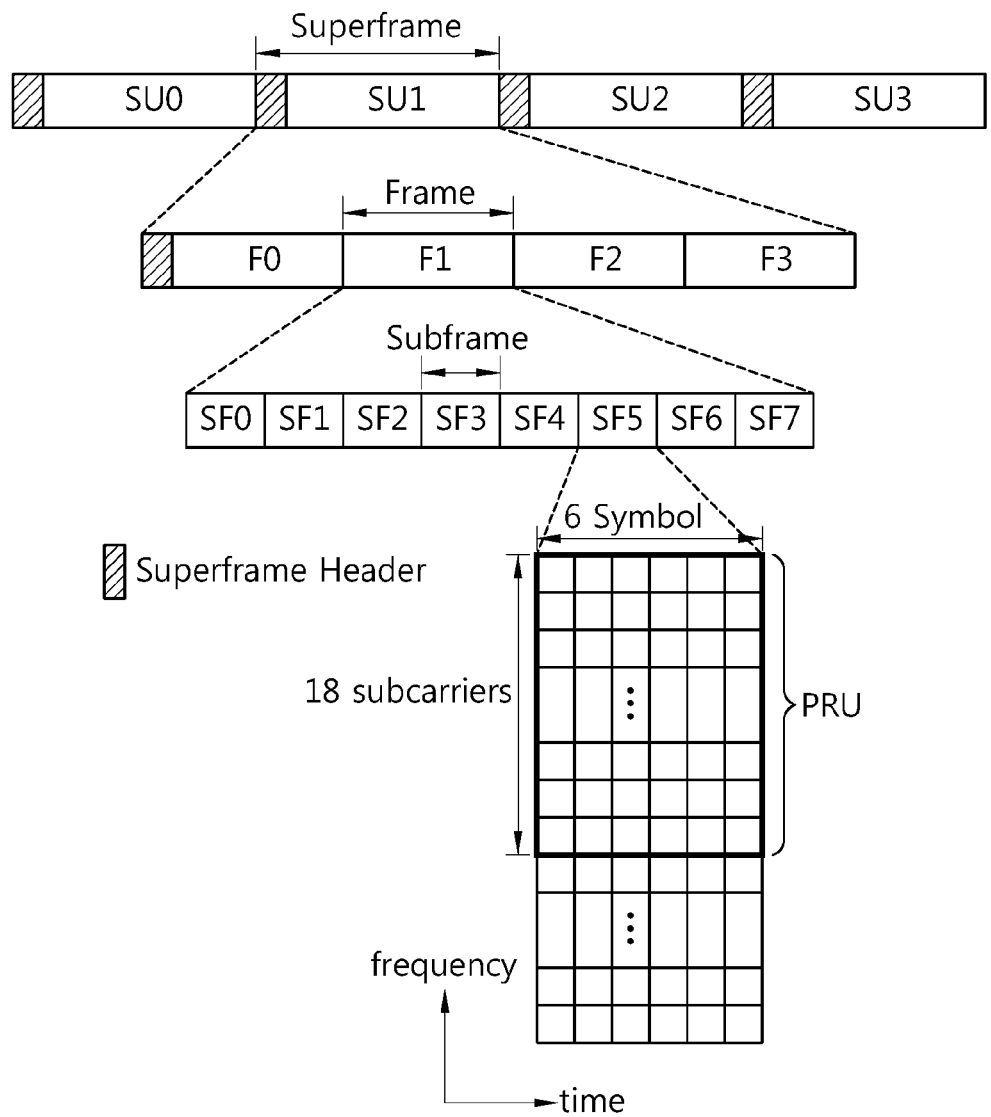
FIG. 2 illustrates an example of the structure of a frame with respect to a carrier.

FIG. 2 illustrates an example of a frame structure with respect to a single carrier.

With reference to FIG. 2, a superframe (SU) includes a superframe header (SFH) and four frames (F0, F1, F2, and F3). The length of each of the frames in the superframe may be equal. It is illustrated that each superframe has a size of 20 ms and each frame has a size of 5 ms, but the present invention is not limited thereto. The length of the superframe, the number of frames included in the superframe, the number of subframes included in each frame may be changed variably. The number of subframes included in each frame may be changed variably depending on a channel bandwidth and the length of a cyclic prefix (CP).

One frame includes a plurality of subframes SF0, SF1, SF2, SF3, SF4, SF5, SF6, and SF7. Each subframe may be used for an uplink or downlink transmission. One subframe includes a plurality of OFDM (orthogonal frequency division multiplexing) symbols or OFDMA (Orthogonal Frequency Division Multiple Access) symbols in a time domain, and includes a plurality of subcarriers in a frequency domain. The OFDM symbol is to express one symbol period and may be called by other terminologies such as OFDMA symbol, SC-FDMA symbol, and the like, according to a multi-access scheme. A subframe may include five, six, seven, or nine OFDMA symbols, but this is merely illustrative and the number of OFDMA symbols is not limited. The number of OFDMA symbols included in a subframe may be changed variably according to a channel bandwidth and a CP length. The type of a subframe may be defined according to the number of OFDMA symbols included in the subframe. For example, a type-1 subframe may be defined to include six OFDMA symbols, a type-2 subframe may be defined to include seven OFDMA symbols, a type-3 subframe may be defined to include five OFDMA symbols, and a type-4 subframe may be defined to include nine OFDMA symbols. One frame may include the same type of subframes. Or, one frame may include different types of subframes. Namely, the number of OFDMA symbols included in each subframe of one frame may be the same or different. Or, the number of OFDMA symbols of at least one subframe in one frame may be different from the number of OFDMA symbols of the other remaining subframes in the frame.

A TDD (Time Division Duplex) scheme or an FDD (Frequency Division Duplex) scheme may be applied to a frame. In the TDD scheme, each frame is used for an uplink transmission or a downlink transmission at a different time at the same frequency. That is, subframes in a frame according to the TDD scheme are divided into uplink subframes and downlink subframes in the time domain. A switching point refers to a point at which a transmission direction is changed from an uplink area to a downlink area or from a downlink area to an uplink area, and the number of switching points in each frame in the TDD scheme may be 2. In the FDD scheme, the respective subframes are used for an uplink transmission or downlink transmission at different frequencies of the same time. Namely, the subframes of a frame according to the FDD scheme are divided into uplink subframes and downlink subframes in the frequency domain. The uplink transmission and the downlink transmission may occupy different frequency bands and may be simultaneously performed.

The superframe header (SFH) may carry an essential system parameter and system configuration information. The superframe header (SFH) may be positioned in a first subframe within the superframe. For example, the superframe header may occupy the last five OFDMA symbols of the first subframe. The superframe header may be classified into a primary SFH (P-SFH) and a secondary SFH (S-SFH). The P-SFH and the S-SFH may be transmitted in every superframe. The S-SFH may be transmitted in two contiguous superframes. Information transmitted in the S-SFH may be divided into three subpackets of S-SFH SP1, S-SFH SP2 and S-SFH SP3. Respective subpackets may be periodically transmitted at different periods. The importance of the information transmitted through S-SFH SP1, S-SFH SP2, and S-SFH SP3 may differ, and S-SFH SP1 may be transmitted at the shortest period, and S-SFH SP3 may be transmitted at the longest period. S-SFH SP1 includes information regarding a network re-entry. S-SFH SP2 includes information regarding an initial network entry and network discovery. S-SFH SP3 may include remaining important system information.

Figure 3:
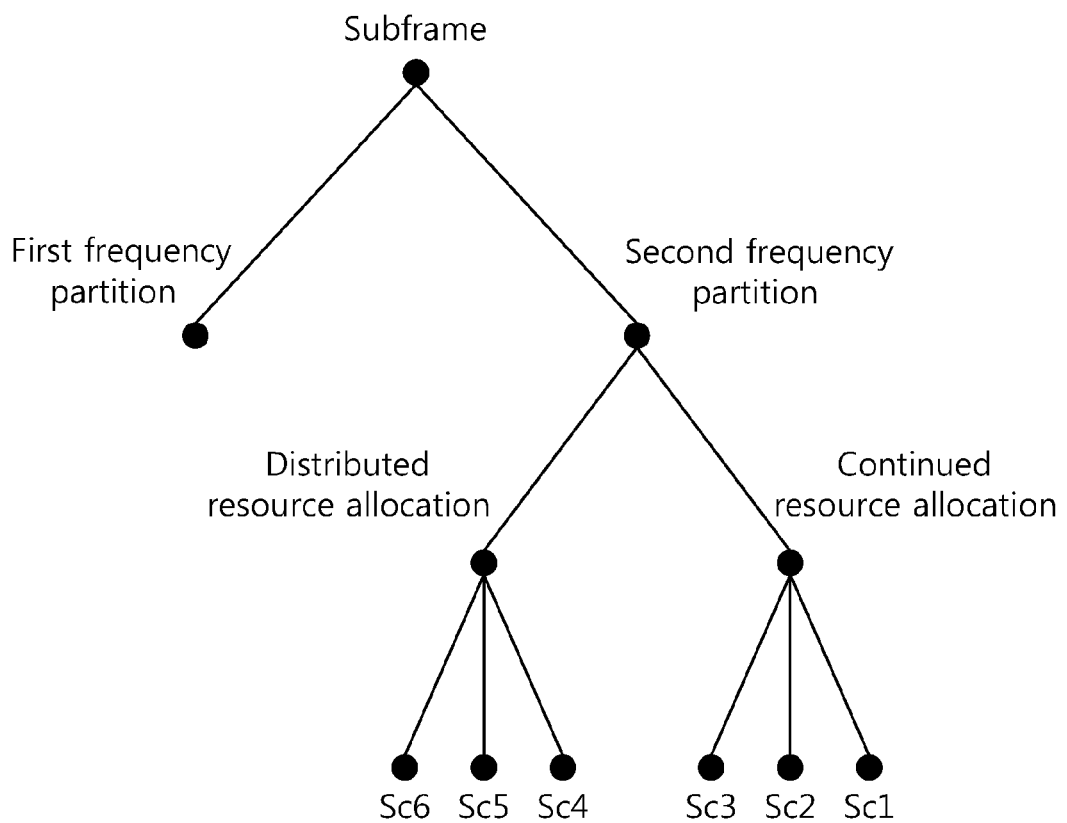
FIG. 3 illustrates an example of an uplink resource structure.

FIG. 3 illustrates an example of an uplink resource structure.

Each uplink subframe may be divided into at least one frequency partition (FP). FIG. 3 shows the case in which a subframe is divided into two frequency partitions (first and second frequency partitions), but the number of frequency partitions in the subframe is not limited thereto. The number of frequency partitions may be a maximum of 4. Each frequency partition includes at least one physical resource unit (PRU) over the entire OFDMA symbols available in a subframe. Also, each frequency partition may include contiguous/localized and/or distributed PRUs. Each frequency partition may be used for a different purpose such as a fractional frequency reuse (FFR). In FIG. 3, the second frequency partition includes both continued resource allocation and distributed resource allocation. 'Sc' denotes subcarrier.

The PRU is a basic physical unit for a resource allocation, including $P_{sc}$ number of contiguous subcarriers and $N_{sym}$ number of contiguous OFDMA symbols. The $P_{sc}$ may be 18. The $N_{sym}$ may be equal to the number of OFDMA symbols included in one subframe. Thus, $N_{sym}$ may be determined according to the type of a subframe. For example, when a subframe includes six OFDMA symbols, the PRU may be defined to include 18 subcarriers and 6 OFDMA symbols.

A logical resource unit (LRU) is a basic logic unit for a distributed and continued resource allocation, and includes the $P_{sc}$ number of subcarriers and the $N_{sym}$ number of OFDMA symbols. The size of the LRU for a transmission of a control channel is equal to the size of an LRU for a transmission of data. A plurality of users may share one control LRU. Also, the LRU may include pilot. Thus, an appropriate number of subcarriers in one LRU is dependent upon the number of allocated pilots and the presence of a control channel.

A distributed logical resource unit (DLRU) may be used to obtain a frequency diversity gain. The DLRU includes a group of subcarriers distributed in a frequency partition. The size of the DLRU is equal to that of a PRU. A minimum unit for forming the DLRU is tile, and the size of an uplink tile is 6 subcarriers*$N_{sym}$ OFDMA symbols. $N_{sym}$ may vary according to a subframe type.

A contiguous logical resource unit (CLRU) may be used to obtain a frequency selective scheduling gain. The CLRU includes a group of contiguous subcarriers. The size of a CLRU is equal to that of the PRU.

Hereinafter, a multi-carrier operation will be described.

First, a carrier will be described. A downlink or uplink frequency channel available in an FDD system or a bi-directional frequency channel available in a TDD system is called a carrier using a physical carrier index. The physical carrier index is allocated to indicate the entirety of carriers available in the overall network, which is indexed in a direction from a low frequency to a high frequency.

The multi-carrier operation will now be described. The multi-carrier operation refers to an operation supporting a plurality of carriers for a mobile station (MS). When the multi-carrier operation is supported, two types of carriers are defined in the terminal's place.

1) Primary carrier: It refers to a stand-alone carrier by which the MS performs an initial network entry process or a network re-entry process. When the multi-carrier operation is supported, the MS may have only the primary carrier or may be allocated the primary carrier and a plurality of secondary carriers (to be described). Every MAC (media access control) control message, which is unicast in relation to the multi-carrier operation, may be transmitted to the MS through the primary carrier.

2) Secondary carrier: It refers to an additional carrier allocated by the BS to the MS.

When the multi-carrier operation is supported, a common MAC in the BS can utilize radio resources in the primary carrier and at least one secondary carrier. Mobility, a MAC state, and context of the MS are managed and controlled by the BS through the primary carrier.

Each physical carrier may be set to be different as follows.

Fully configured carrier: It refers to a stand-alone carrier by which every control channel such as synchronization, broadcast, multicast, unicast, or control signaling, is configured. The fully configured carrier is supported by every MS regardless of whether or not multi-carrier is supported.

Partially configured carrier: It refers to a carrier configured only for a downlink transmission. The partially configured carrier may be used only when it is connected to the primary carrier, and cannot be used alone to provide an AAI (advanced Air Interface) service to the MS.

If the partially configured carrier is used for downlink unicast traffic, a requested uplink feedback channel is provided by the primary carrier. In a multi-carrier aggregation, uplink control channels corresponding to partially configured secondary carriers, namely, secondary carriers used only in downlink, are positioned at a control region which does not overlap in uplink of the primary carrier. The uplink control region for the secondary carriers used only in downlink is positioned behind an uplink control region for the primary carrier.

The position information of the uplink control region for the secondary carriers used only in downlink is provided through an AAI_SCD (system configuration descriptor) message transmitted in the secondary carriers. The MS uses uplink control channels of the primary carrier in order to feed back HARQ ACK/NACK, channel quality measurement, or the like, corresponding to the transmission of the secondary carriers used only in downlink. FDD primary carriers may be used to provide uplink feedback channels for the downlink partially configured carrier. The partially configured carrier may be optimized for an E-MBS (evolved multimedia broadcast multicast service) and used only when supporting of an uplink feedback channel is not required in the primary carrier.

Figure 4:
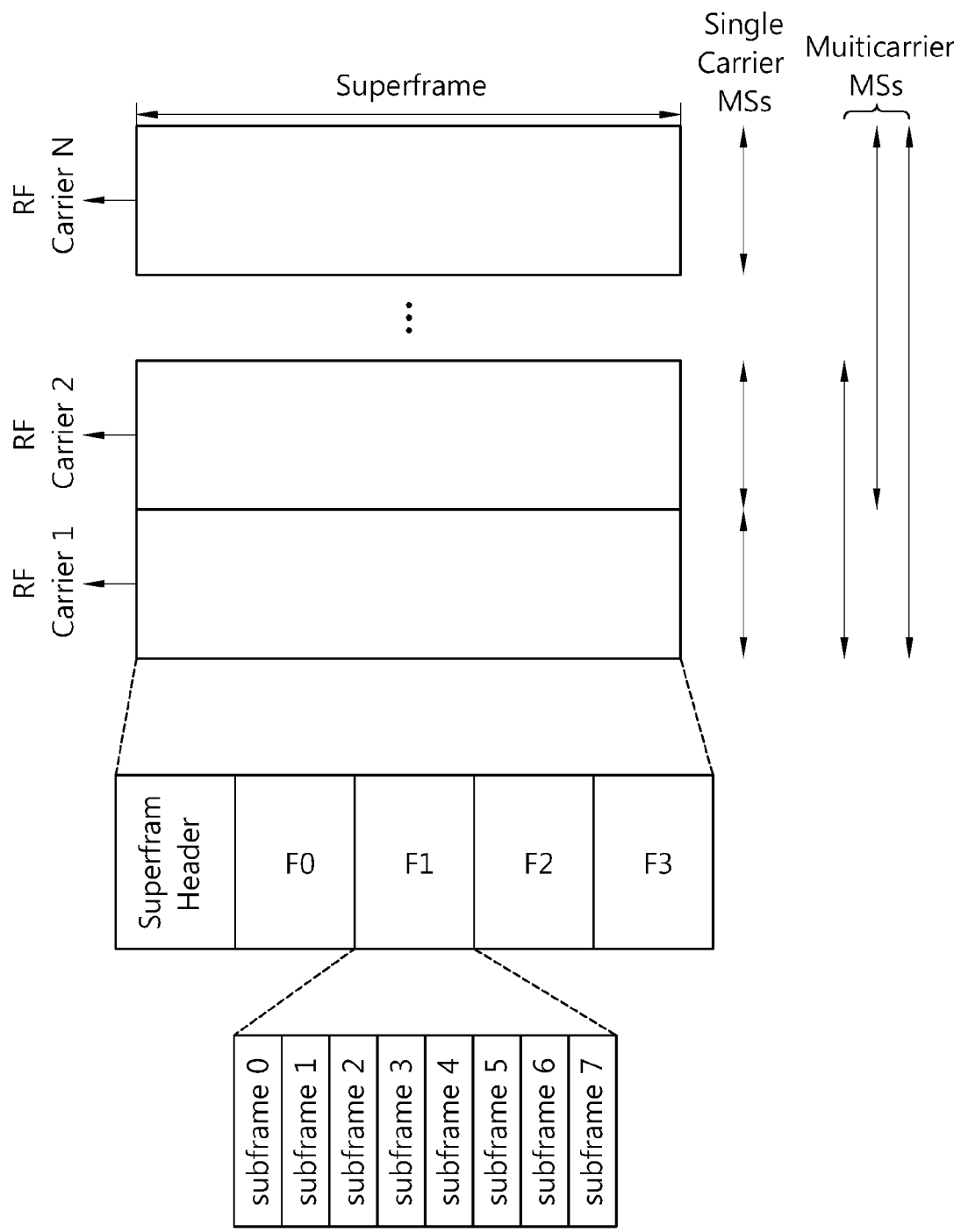
FIG. 4 illustrates the structure of a frame supporting a multi-carrier operation.

FIG. 4 illustrates the structure of a frame for supporting the multi-carrier operation.

With reference to FIG. 4, in the multi-carrier operation, each carrier has the same frame structure as described above with reference to FIG. 2, and a plurality of such carriers are used. Namely, each carrier may have its superframe structure, one superframe may include four frames, and each frame may include a plurality of subframes, e.g., 8 subframes. In this case, some of the carriers may have only a portion of the superframe header. In the uplink of the FDD, a preamble and the superframe header can be replaced with traffic OFDMA symbols.

The plurality of carriers related to the multi-carrier operation may be contiguous or discontiguous in the frequency domain. When the plurality of carriers are contiguous in the frequency domain, the center frequency of the contiguous carriers may be separated by an integer-multiple of the interval between subcarriers, and a guard subcarrier is not required between contiguous carriers.

Primary carriers are fully configured, while the secondary carriers may be fully configured or partially configured according to a disposition scenario. Whether which of the carriers are to be fully configured or partially configured is indicated by using a PA (primary advanced)-preamble of the carriers. The MS does not attempt a network entry or handover through partially configured carriers.

Each MS is controlled through the primary carrier. When the multi-carrier mode is supported, the system is able to define and use additional carriers in order to improve the system capacity. The additional carriers are secondary carriers.

When secondary carriers for a certain MS are fully configured carriers, they may also be used as primary carriers for a different MS. A plurality of MSs having different primary carriers may share the same physical carrier as their secondary carrier.

The multi-carrier operation may support at least one of the various modes as follows.

1) A multi-carrier aggregation mode: It is a mode in which an MS maintains a physical layer connection with the primary carrier and monitors control signaling while processing a data transmission in secondary carriers. A resource allocation with respect to the MS may extend to the primary carrier and a plurality of secondary carriers. In this mode, the system may allocate the secondary carriers to downlink and/or uplink to the MS. The secondary carriers may be asymmetrically allocated to downlink and uplink, and this may be determined according to the capability of the MS, a system load, a maximum data rate, QoS (Quality of Service), and the like.

2) Multi-carrier switching mode: When it is indicated to receive an E-MBS service through the secondary carriers by the BS, the MS switches a physical layer connection to partially configured or fully configured secondary carriers from the primary carrier in this mode. The MS is connected to the secondary carriers for a particular time interval and then returned to the primary carrier. When the MS is connected to the secondary carriers, it is not requested to maintain a transmission or reception through the primary carrier.

3) Basic multicarrier (MC) mode: It is a mode in which the MS operates with a single carrier. However, this mode supports an optimized scanning process of carriers related to a multi-carrier operation and a primary carrier replacing process.

An MS supporting at least one of the foregoing multi-carrier modes is called a multi-carrier MS, and an MS other than the multi-carrier MS is called a single carrier MS.

Hereinafter, a control channel for transmitting a control signal or a feedback signal will be described. The control channel may be used to transmit various types of control signals for communications between the BS and the MS. The control channel described hereinafter may be applicable to an uplink control channel, a downlink control channel, and the like.

The control channel may be designed in consideration of the followings.

(1) A plurality of tiles included in the control channel may be distributed to the time domain or the frequency domain in order to obtain a frequency diversity gain. For example, considering that a DLRU includes three tiles comprised of six contiguous subcarriers on six OFDM symbols, the control channel may include three tiles and each of the tiles may be distributed to the frequency domain and the time domain. Or, the control channel may include at least one tile, the tile may be comprised of a plurality of mini-tiles, and the plurality of mini-tiles may be distributed to the frequency domain or the time domain. For example, the mini-tiles may be configured such that (OFDM symbols×subcarriers)=6×6, 3×6, 2×6, 1×6, 6×3, 6×2, 6×1, and the like. When it is assumed that a control channel including tiles of a PUSC structure of (OFDM symbols×subcarriers)=3×4 of IEEE 802.16e and a control channel including mini-tiles are multiplexed according to an FDM (frequency division multiplexing) scheme, the mini-tiles may be configured such that (OFDM symbols×subcarriers)=6×2, 6×1, and the like. When only the control channel including mini-tiles is considered, the mini-tiles may be configured such that (OFDM symbols×subcarriers)=6×2, 3×6, 2×6, 1×6, and the like.

(2) The number of OFDM symbols constituting a control channel to support a high speed MS must be minimized. For example, in order to support an MS moving at 350 km/h, an appropriate number of OFDM symbols constituting a control channel is 3 or smaller.

(3) Transmission power per symbol of the MS has a limitation, so in order to increase transmission power per symbol of the MS, a larger number of the OFDM symbols constituting the control channel is advantageous. Thus, an appropriate number of the OFDM symbols must be determined in consideration of (2) the high speed MS and (3) the transmission power per symbol of the MS.

(4) For a coherent detection, pilot subcarriers for a channel estimation must be evenly distributed to the time domain or the frequency domain. The coherent detection is a method for obtaining data included in data subcarriers after performing a channel estimation by using pilot. For power boosting of the pilot subcarriers, the transmission power per symbol can be uniformly maintained when the number of pilots per OFDM symbol of the control channel is equal.

(5) For a non-coherent detection, a control signal must be configured as an orthogonal code/sequence or a semi-orthogonal code/sequence, or spread.

The uplink control channel may include a fast feedback channel (FFBCH), a hybrid automatic repeat request feedback channel (HFBCH), a ranging channel, a bandwidth request channel (BRCH), and the like. Information such as a CQI, MIMO feedback, ACK/NACK, an uplink synchronization signal, a bandwidth request, or the like, can be transmitted through the uplink control channel. The FFBCH, HFBCH, ranging channel, BRCH, or the like, may be positioned anywhere on an uplink subframe or a frame.

The uplink control channel may be allocated through downlink control information transmitted through downlink from the BS. The downlink control information may be broadcast to every MS, or may be transmitted to each MS through a unicast service. The foregoing P-SFH or S-SFH is a broadcast downlink control signal, and a plurality of A-MAP IE (Advanced-MAP Information Element) may be defined as a basic element of unicast service controlling.

Hereinafter, a feedback method of the MS in a system supporting the multi-carrier mode will now be described.

The uplink control channel may include 1. An uplink control channel according to a request from the BS, and 2. An even-driven uplink control channel by the MS arbitrarily or according to a particular reference.

1. Uplink Control Channel According to a Request from the BS

1) The BS may transmit an A-MAP IE requesting an uplink control channel, e.g., a feedback allocation A-MAP IE, a feedback polling A-MAP IE, or the like, via downlink of each carrier. The A-MAP IE can be transmitted through downlink carriers which requires the uplink control channel, and upon receiving the A-MAP IE through the downlink carriers, the MS may transmit information regarding the uplink control channel corresponding to the downlink carriers through primary carriers or through uplink carriers linked to the downlink carriers.

For example, when the MS receives the feedback polling A-MAP IE, the MS transmits AAI_SingleBS_MIMO_FBK message, AAI_MultiBS_MIMO_FBK message, MIMO feedback header, a CMFH (correlation matrix feedback header), or the like, according to the number of transmission antennas of the BS and requested feedback content. In this case, since the BS and the MS mutually know about the position where the control channel is transmitted, there is no need to inform about to which of carriers the uplink control channel is related. Namely, since the BS and the MS know about the implicit mapping relationship between the uplink control channel and the carrier, there is no need to inform about to which of carrier the uplink control channel is related.

2) The BS may request an uplink control channel through a MAC control message, rather than through the A-MAP IE. Namely, the BS may request an uplink control channel from the MS through a MAC control message. For example, the BS may transmit a message such as AAI_FFR_CMD, AAI_UL_POWER_ADJ, or the like, as a MAC control message. The control message includes a message which indicates parameters required for a power status report of the UE such as AAI_UL_PSR_CFG (Power Status Report ConFiGuration). A message of the uplink control channel by the MS in response to the request of the uplink control channel through the MAC control message by the BS includes AAI_FFR_REP, MULTI_BS_MIMO_RSP, or the like. Such a control message is transmitted only through a primary carrier, which has been determined in standard (IEEE 802.16m D7). In this case, a problem arises in that the MS cannot identify to which of carriers the MAC control message transmitted through the primary carrier is related.

2. Event-Driven Uplink Control Channel

When an event occurs arbitrarily or when an event satisfying a particular reference occurs rather than according to a request from the BS, the MS may transmit an uplink control channel to the BS. For example, the MS may transmit a UL_PSR (uplink power status report) message according to the event-driven. In this case, the current standard (IEEE 802.16m D7) stipulates that such a control message should be transmitted to the BS only through the primary carrier. When the MS operates in the multi-carrier mode, a problem arises in that the BS cannot identify to which of carriers the control message transmitted by the MS through the primary carrier is related.

Hereinafter, a feedback method of the MS in the multi-carrier mode to solve the foregoing problems will now be described.

Figure 5:
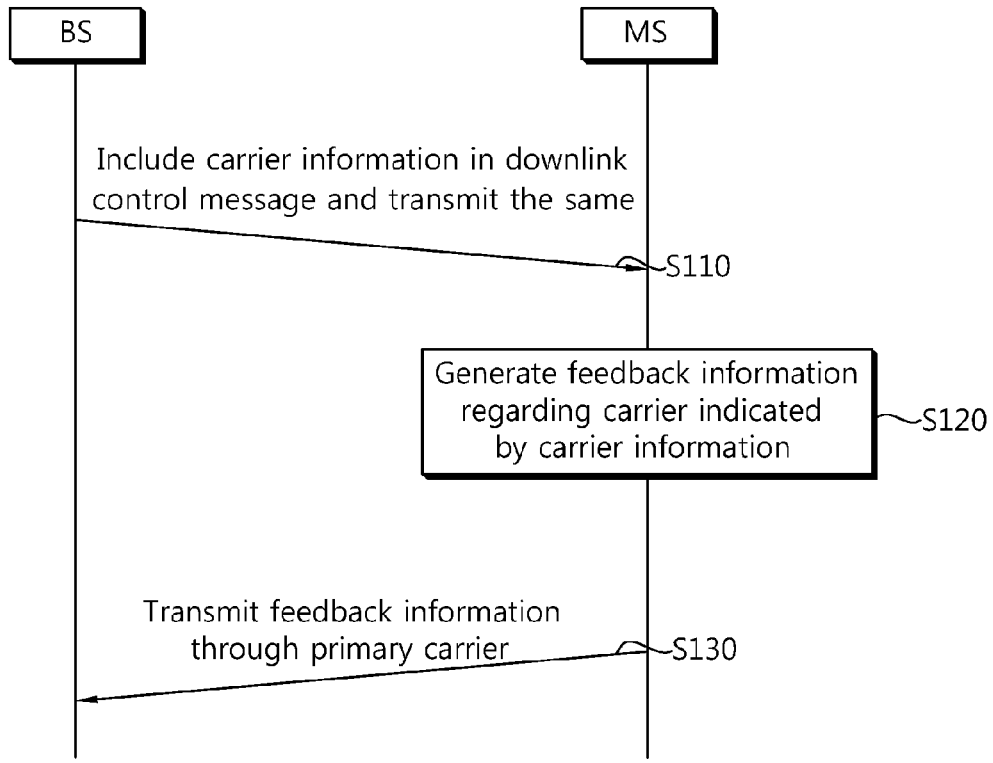
FIG. 5 is a flow chart illustrating an example of the process of a feedback method of a mobile station in a multi-carrier mode according to an exemplary embodiment of the present invention.

FIG. 5 is a flow chart illustrating the process of a feedback method of an MS in a multi-carrier mode according to an exemplary embodiment of the present invention.

With reference to FIG. 5, the BS includes carrier information in a downlink control message instructing a transmission of an uplink control channel, and transmits the same (S110). For example, it is assumed that three downlink carriers are allocated to the MS. When the BS transmits AAI_FFR_CMD message, the MS cannot know about which of downlink carriers the MS is to perform measurement. Here, the AAI_FFR-CMD message is a control message transmitted by the BS to indicate that the MS should perform measurement on a particular frequency partition. Thus, by including the information regarding on the corresponding carrier in the downlink control message and transmitting the same, the BS can inform the MS that on which of downlink carriers the MS should perform an operation according to the downlink control message.

Table 1 below shows the AAI_FFR-CMD message as an example of a downlink control message which includes carrier information and is transmitted by the BS.

TABLE 1

| M/O | Attributes/Array of attributes | Size (bits) | Value/Note | Conditions |
|---|---|---|---|---|
| M | Control Message Type | 8 | Type of AAI_FFR-CMD | N.A. |
| M | frequencyPartitionBitMap | 4 | Each bit indicates the interference statistics report status of corresponding Frequency Partition. 0b0: no report interference statistics 0b1: report interference statistics Frequency Partition Bitmap shall | N.A. |

TABLE 1-continued

| M/O | Attributes/Array of attributes | Size (bits) | Value/Note | Conditions |
|---|---|---|---|---|
| | | | contain at least one bit with value "1". The LSB indicates the lowest available FP and the MSB indicates the highest available FP where the size of an available FP is bigger than zero. | |
| M | reportType | 4 | Each bit indicates if one type of report is required to be sent by AMS. If one bit has value '1', it indicates the specific report type is required to be sent, otherwise it indicates the specific report type is not required to be sent. At least 1 bit needs to be set to value '1'. LSB#0: Interference-Mean LSB#1: Interference-Variance LSB#2: SINR-Mean LSB#3: SINR-Variance | |
| M | frameOffset | 8 | The offset (in units of frames) from the current frame in which AAI_FFR-REP message shall be transmitted on the unsolicited UL resource. | |
| O | PhysicalCarrierIndex | 5 or 6 | The physical carrier index configured by the message | |

The AAI_FFR-CMD message illustrated in Table 1 is a control message transmitted by the BS to indicate that the MS should perform measurement on a particular frequency partition as mentioned above. In every table including Table 1, M in 'M/O' indicates a mandatory parameter and O indicates an optional parameter. The AAI_FFR-CMD message includes parameters such as 'Control Message Type' indicating a message type, 'frequencyPartitionBitMap' indicating on which of frequency partitions measurement should be performed, 'reportType' indicating the type of a reported value, 'frameOffsee' indicating at which frame, having a certain offset value, a response should be transmitted, 'PhysicalCarrierIndex' indicating a physical carrier index set by the AAI_FFR-CMD message. Among the parameters, the 'PhysicalCarrierIndex' is a parameter added to the multi-carrier mode. The BS can indicate which of carriers the MS should perform measurement on a frequency partition of through the 'PhysicalCarrierIndex' parameter.

Table 2 below shows the AAI_UL_RSP-CFG message as an example of the downlink control message which includes carrier information and is transmitted by the BS.

TABLE 2

| M/O | Attributes/Array of attributes | | Size (bits) | Value/Note | Conditions |
|---|---|---|---|---|---|
| M | uplinkPowerStatusReport | | 1 | disable(0), enable(1) | N.A. |
| O | psrReportConfigParameters | txPowerReportThreshold | 4 | txPowerReportThreshold is a 4 bit unsigned integer value in 0.5 dB steps, the specific value "0b1111" shall be interpreted as "infinite" | Present when uplinkPowerStatusReport is enabled |
| | psrReportConfigParameters | txPowerReportMinimumInterval | 4 | txPowerReportMinimumInterval is coded by 4 bit unsigned integer values d representing $2^d$ frames, the specific value d = 0b1111 shall be interpreted as "infinite" | |
| | psrReportConfigParameters | txPowerReportPeriodicalInerval | 4 | txPowerReportPeriodicalInterval is coded by 4 bit unsigned integer values d representing $2^d$ frames, the specific value d = 0b1111 shall be interpreted as "infinite" | |
| | psrReportConfigParameters | PhysicalCarrierIndex | 5 or 6 | The physical carrier index configured by the message | |

The AAI_UL_RSP-CFG illustrated in Table 2 is a message used by the BS that the MS should report an uplink power status, which can be unicast. The AAI_UL_RSP-CFG message may include parameters such as 'uplinkPowerStatusReport' indicating whether the uplink power status report has been activated, 'psrReportConfigParameters' indicating a transmission power report threshold value, a transmission power report minimum duration, and the period of a transmission power report, and a parameter indicating the index of a physical carrier set by the message.

With reference to FIG. 5, the MS generates feedback information regarding a carrier indicated by carrier information (S120). The MS transmits the generated feedback information through the primary carrier (S130). The BS and the MS know about to which of carriers the generated feedback information is related, the feedback information can be transmitted in the multi-carrier mode without generating ambiguity.

Figure 6:
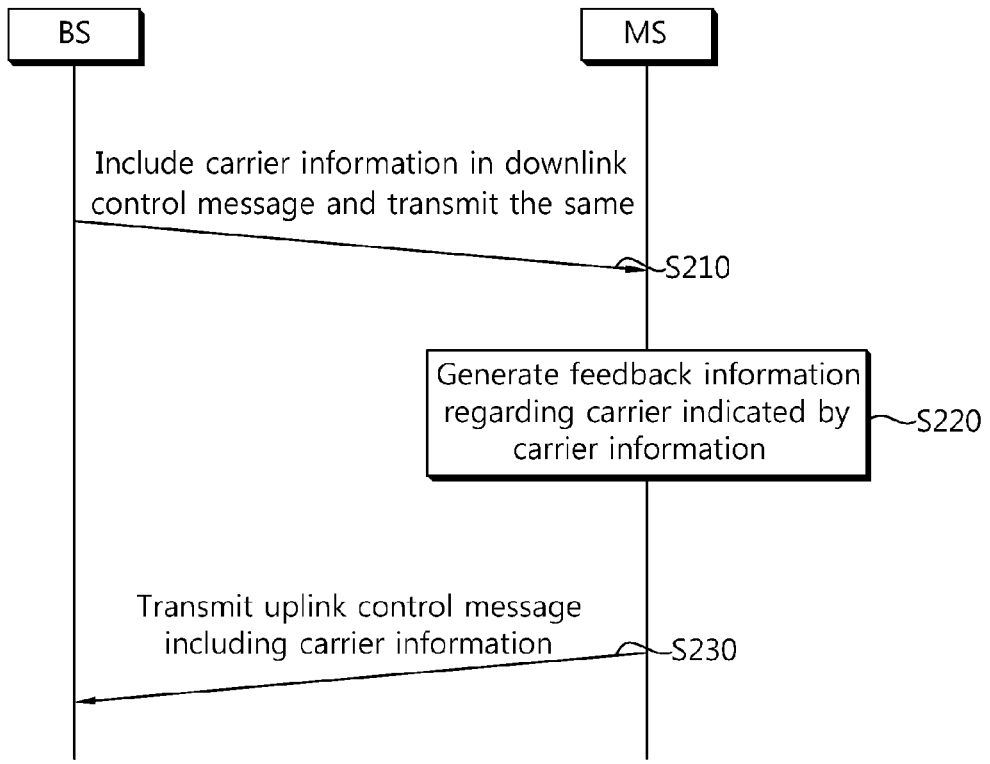
FIG. 6 is a flow chart illustrating another example of the process of a feedback method of a mobile station in a multi-carrier mode according to an exemplary embodiment of the present invention.

FIG. 6 is a flow chart illustrating another example of the feedback method of the MS in the multi-carrier mode according to an exemplary embodiment of the present invention.

With reference to FIG. 6, the BS includes carrier information, i.e., a carrier index, in a downlink control message and transmits the same (S210).

The MS generates feedback information regarding the carrier indicated by the carrier information, i.e., the carrier index (S220). The MS transmits an uplink control message including the carrier information to the BS (S230). In this case, the uplink control message may be transmitted through a primary carrier.

There may be two methods for including the carrier information in the uplink control message by the MS. A first method is including the carrier information in the uplink control message itself and transmitting the same. A second method is defining a header informing about the carrier information and adding it to an uplink control message requiring the carrier information.

First, the example of including the carrier information in the uplink control message itself will now be described.

Table 3 below shows an AAI_FFR-REP message format according to an exemplary embodiment of the present invention, showing an example of including carrier information in an uplink control message. When the MS receives the AAI_FFR-CMD message, it measures a downlink interference and/or SINR with respect to a frequency partition defined in the AAI_FFR-CMD message, generates an AAI-FFR-REP message, and transmits it to the BS.

TABLE 3

| M/O | Attributes/Array of attributes | Size (bits) | Value/Note | Conditions |
|---|---|---|---|---|
| M | Control Message Type | 8 | Type of AAI_FFR-REP | N.A. |
| M | frequency-PartitionBitMap | 4 | Each bit indicates the interference statistics report status of corresponding Frequency Partition. 0b0: no report interference statistics 0b1: report interference statistics Frequency Partition Bitmap shall contain at least one bit with value "1". The LSB indicates the lowest available FP and the MSB indicates the highest available FP where the size of an available FP is bigger than zero. | N.A. |
| M | reportType | 4 | Each bit indicates if one type of report is required to be sent by AMS. If one bit has value '1', it indicates the specific report type is required to be sent, otherwise it indicates the specific report type is not required to be sent. At least 1 bit needs to be set to value '1'. LSB#0: Interference-Mean LSB#1: Interference-Variance LSB#2: SINR-Mean LSB#3: SINR-Variance | |
| O | FFR-REPORT | Variable | | |
| O | A) fp0Report | Variable | FFR-FeedbackIE | Present when 0-th LSB of frequency-PartitionBitmap is 0b1 |
| O | B) fp1Report | Variable | FFR-FeedbackIE | Present when 1-th LSB of frequency-PartitionBitmap is 0b1 |
| O | C) fp2Report | Variable | FFR-FeedbackIE | Present when 2-th LSB of frequency-PartitionBitmap is 0b1 |
| O | D) fp3Report | Variable | FFR-FeedbackIE | Present when 3-th LSB of frequency-PartitionBitmap is 0b1 |
| O | FFR-FeedbackIE | Variable | | |
| | A) interferenceMean | 8 | Interference mean. This is noise plus inter-cell interference power level which is averaged over the frequency partition and divided by | Present when 0-th LSB of reportType is 0b1 |

TABLE 3-continued

| M/O | Attributes/Array of attributes | Size (bits) | Value/Note | Conditions |
|---|---|---|---|---|
| | | | the number of subcarriers in the frequency partition. −134 dBm to −30 dBm in units of 1 dB. −134 dBm is encoded as 0x00, −30 dB is encoded as 0x68, 0x69 to 0xFF is reserved. | |
| | B) interference-Variance | 4 | Interference variance 0dB to 15dB in units of 1dB | Present when 1-st LSB of reportType is 0b1 |
| | C) sinrMean | 8 | SINR mean − 16 dB to 53 dB in units of 0.5 dB-16 dB is encoded as 0x00, 53 dB is encoded as 0x8A, 0x8B-0xFF are reserved | Present when 2-nd LSB of reportType is 0b1 |
| | D) sinrVariable | 4 | SINR variance 0 dB to 15 dB in units of 1 dB | Present when 3-rd LSB of reportType is 0b1 |
| O | PhysicalCarrier-Index | 5 or 6 | The physical carrier index configured by the message | |

With reference to table. 3, the AAI_FFR-REP message format includes parameters such as 'ControlMessageType' indicating the type of a control message, 'frequencyPartitionBitMap' indicating which frequency partition has been measured, 'reportType' indicating what is a report value, 'fp0Report' to 'fp3Report' indicating a feedback value with respect to each frequency partition according to the bit of the 'frequencyPartitionBitMap', 'interferenceMean', 'interferenceVariance', 'sinrMean', 'sinrVariable' indicating a feedback value according to the bit of the 'reportType', 'PhysicalCarrierIndex' indicating an activation carrier related to this message, and the like. Namely, the MS may transmit the index of the activation carrier to which the uplink control message is related, along with the uplink control message.

Table 4 below shows an AAI_UL_PSR header format according to an exemplary embodiment of the present invention. The AAI_UL_PSR header format is used for the MS to transmit information regarding an uplink power control status to the BS. The AAI_UL_PSR header format illustrated in Table 4 is an example of including carrier information in an uplink control message.

TABLE 4

| Syntax | Size(bit) | Notes |
|---|---|---|
| Uplink Power Status Report Header( ) { | | |
| FID | 4 | Flow Identifier. Set to 0001. |
| Type | 5 | Mac Signaling header type = 0b00101 |
| Length | 3 | Indicates the length of the signaling header: 0b101: 5 bytes |
| ULPC Parameters Updating Indicator | 1 | Indicates whether the AMS has updated its ULPC parameters from AAI_SCD: 0: No ULPC parameters changed comparing to previous reporting. 1: The confirmation of new ULPC parameters from AAI_SCD applied. |
| Change configuration change | 4 | Only valid if ULPC Parameters Updating Indicator == 0b1 The value is the same as 2 LSB of "Change configuration change" in the latest AAI_SCD message. |
| txPowerPsdBase | 8 | txPowerPsdBase (PSD(base)) is coded using 8 bits in 0.5 dBm steps ranging from −74 dBm(coded 0x00) to 53.5 dBm(coded 0xFF). |

TABLE 4-continued

| Syntax | Size(bit) | Notes |
|---|---|---|
| txSirDownlink | 10 | txSirDownlink(SIRDL) is coded using 10 bits in 1/16 dB steps ranging from −12 dB(coded 0x00) to 51.9375 dB(coded 0x3ff) |
| Physical Carrier Index or Logical Carrier Index | 5 or 3 | Physical Carrier Index for PSR related carrier, this field should be ignored in the case of only single carrier active or Logical Carrier Index of the activated carriers for PSR related carrier, this field should be ignored in the case of only single carrier active |
| Reserved } | 0 or 2 | Shall be filled by 0 for byte alignment |

The AAI_UL_PSR header may include a flow ID (FID), 'Type' indicating a MAC signaling header type, 'Length' indicating the length of a signaling header, 'ULPC Parameter updating Indicator' indicating whether or not uplink power control parameters have been updated from AAI_SCD, and 'Physical Carrier Index' indicating an activation carrier related to the AAI_UL_PSR header.

The conventional AAI_UL_PSR header format does not include 'Physical Carrier Index', but in the present invention, the 'Physical Carrier Index' is included in the AAI_UL_PSR header. The case in which 'Physical Carrier Index' is comprised of 5 bits is illustrated, but the present invention is not limited thereto. Namely, the 'Physical Carrier Index' may be comprised of 6 bits, and in this case, reserved bits may be 7 bits. Also, a carrier to which the AAI_UL_PSR header is related may be informed through a logical carrier index, rather than through a physical carrier index. In this case, only activated carriers for the MS are subjected to indexing, so the number of bits can be reduced. For example, when a total of 64 physical carriers can be used in a system and five carriers are activated for the MS, 6 bits are required to indicate the physical carrier index while 3 bits are required for the logical carrier index.

Table 5 below shows an MFH (MIMO feedback header) format according to an exemplary embodiment of the present invention. The MFH format is transmitted by the MS to the BS in response to a feedback polling A-MAP IE.

TABLE 5

| Syntax | Size(bit) | Notes |
|---|---|---|
| MFM( ) { | | |
| FID | 4 | Flow Identifier. Set to 0001. |
| Type | 5 | Mac Signaling header type = 0b00111 |
| Length | 3 | Indicates the length of the signaling header. |
| MFM bitmap | 3 | Bitmap to indicate the MFMs for which the AMS is sending feedback. It shall be consistent with current feedback allocations corresponding to the MFM requested by Feedback Polling A-MAP IE. LSB #0: MFM 0 LSB #1: MFM 4 LSB #2: MFM 7 |
| If (LSB#0 in MFM_bitmap == 1){ | | MFM 0 |
| Wideband CQI | 4 | |
| Wideband STC rate | 3 | 'STC rate - 1' mapped to 3bit unsigned integer (i.e., STC rate = 1 as 0b000~STC rate = 8 0b111) |
| } | | |
| If (LSB#1 in MFM bitmap == 1){ | | MFM 4 |
| Wideband CQI | 4 | |
| Wideband STC rate | 3 | 'STC rate - 1' mapped to 3bit unsigned integer (i.e., STC rate = 1 as 0b000~STC rate = 8 as 0b111) |
| Wideband PMI | 6 | wideband preferred matrix index (PMI), size of which is number of PMI bits ('NB') used, mapped to NB LSB bits of this field, while the remaining MSB bit(s) set to zero(0) |
| } | | |
| If (LSB#2 in MFM_bitmap == 1){ | | MFM 7 |
| Wideband CQI | 4 | |
| Wideband PMI | 6variable | wideband preferred matrix index (PMI), size of which is number of PMI bits ('NB') used, mapped to NB LSB bits of this field, while the remaining MSB bit(s) set to zero(0) |
| } | | |
| Logical Carrier Index | 3 | Logical Carrier Index of the activatedcarriers for PSR related carrier, this field should be ignored in the case of only single carrier active |
| Reserved | variable | For byte alignment |
| } | | |

The MFH format is used to transmit broadband information when a MIMO feedback mode (MFM) is MFM 0, 4, 7, or a certain combination of the MFM 0, 4, 7.

The MFM 0 supports an application of an SFBC (Space-Frequency Block Code) and SM (Spatial Multiplexing) of an OL-SU (Open Loop-Single User) MIMO environment in a diversity permutation. For the SFBC and SM, the MS measures a broadband CQI and reports the CQI and an STC (Space Time Coding) rate to the BS.

The MFM 4 is used for a CL (Closed Loop)-SU MIMO using broadband beamforming. The MS feeds back a broadband CQI. The broadband CQI is estimated by the MS on the assumption of BS's short-term or long-term precoding according to a feedback period. The BS obtains channel status information through feedback of a correlation matrix or through feedback of a broadband PMI.

The MFM 7 supports CL-MU (Closed Loop-Multi User) MIMO environment in the diversity permutation using broadband beamforming. The MS feeds back a broadband CQI and a broadband PMI (preferred matrix index).

'Logical Carrier Index' included in Table 5 is a parameter indicating which of carriers the MFH format is related, through a logical index.

The case in which the uplink control message directly includes the carrier information has been illustrated through Table 3 to Table 5. Hereinafter, a case in which a header, e.g., a MAC signaling header is newly defined to include carrier information, rather than including the carrier information directly in the uplink control message, will now be described. Namely, the second method (which defines a header providing carrier information and adds it to an uplink control message requiring carrier information) will now be described.

A MAC signaling header is solely or connected with other MAC PDUs and transmitted via uplink or downlink. One flow ID is reserved for the MAC signaling header, and its value is '0010b'.

Table 6 below shows an example of the MAC signaling header format.

TABLE 6

| Syntax | Size (bits) | Notes |
|---|---|---|
| MAC Signaling Header( ) { | | |
| FID | 4 | Flow Identifier. Set to 0010 |
| Type | 5 | MAC signaling header type |

TABLE 6-continued

| Syntax | Size (bits) | Notes |
| --- | --- | --- |
| Length | 3 | Indicates the length of the signaling header (includes the FID, Type, Length and contents):<br>0b000 and 0b001: reserved<br>0b010: 2 bytes<br>0b011: 3 bytes<br>0b100: 4 bytes<br>0b101: 5 bytes<br>0b110: 6 bytes<br>0bl 11: reserved |
| Contents | variable; ≤36 | MAC signaling header contents, with the size indicated by the length field.<br>The size in bits is Length*8-12 |
| } | | |

In Table 6, the type of the MAC signaling header is indicated by a 'Type' field, and a new MAC signaling header, which can be used for every case for which an index of a carrier is required in the multi-carrier mode, can be defined.

Table 7 below shows MAC signaling header types indicated by the 'Type' field of Table 6.

TABLE 7

| Type field (5 bits) | MAC signaling Header Type |
| --- | --- |
| 00000 | BR with STID |
| 00001 | BR without STID |
| 00010 | Service Specific Scheduling Control Header |
| 00011 | Sleep Control |
| 00100 | AMS Battery Level Report |
| 00101 | Uplink Power Status Report |
| 00110 | Correlation Matrix Feedback |
| 00111 | MIMO Feedback |
| 01000 | Carrier Index Report |
| 01001 - 11111 | Reserved |

Unlike the related art, in Table 7, when the vale of 'Type' field is '01000b', it denotes a MAC signaling header indicating a carrier index report.

Table 8 below shows an implementation of the MAC signaling header indicating a carrier index report.

TABLE 8

| Syntax | Size (bits) | MAC signaling Header Type |
| --- | --- | --- |
| Carrier Index Report Header Q { | | |
| FID | 4 | Flow Identifier. Set to 0010 |
| Type | 5 | Carrier Index Report Header type = 0100 |
| Length | 3 | Indicates the length of the signaling header. Set to 0b011 (3 bytes) or 0b010 (2 bytes) |
| Physical carrier index or | 5 or 3 | Physical carrier index of the followedheader or control message |
| Logical carrier index | | or Logical carrier index of the followed header or control message |
| } | | |

In every case in which MS or BS requires a carrier index, the MS or the BS adds the MAC signaling header defined as shown in Table 8 and transmits it to indicate a particular carrier. Thus, when the MAC signaling header is used, an uplink control message or a downlink control message can be transmitted without including the carrier information such as a carrier index. Of course, the MAC signaling header may not be included when a carrier index is not requested.

Figure 7:
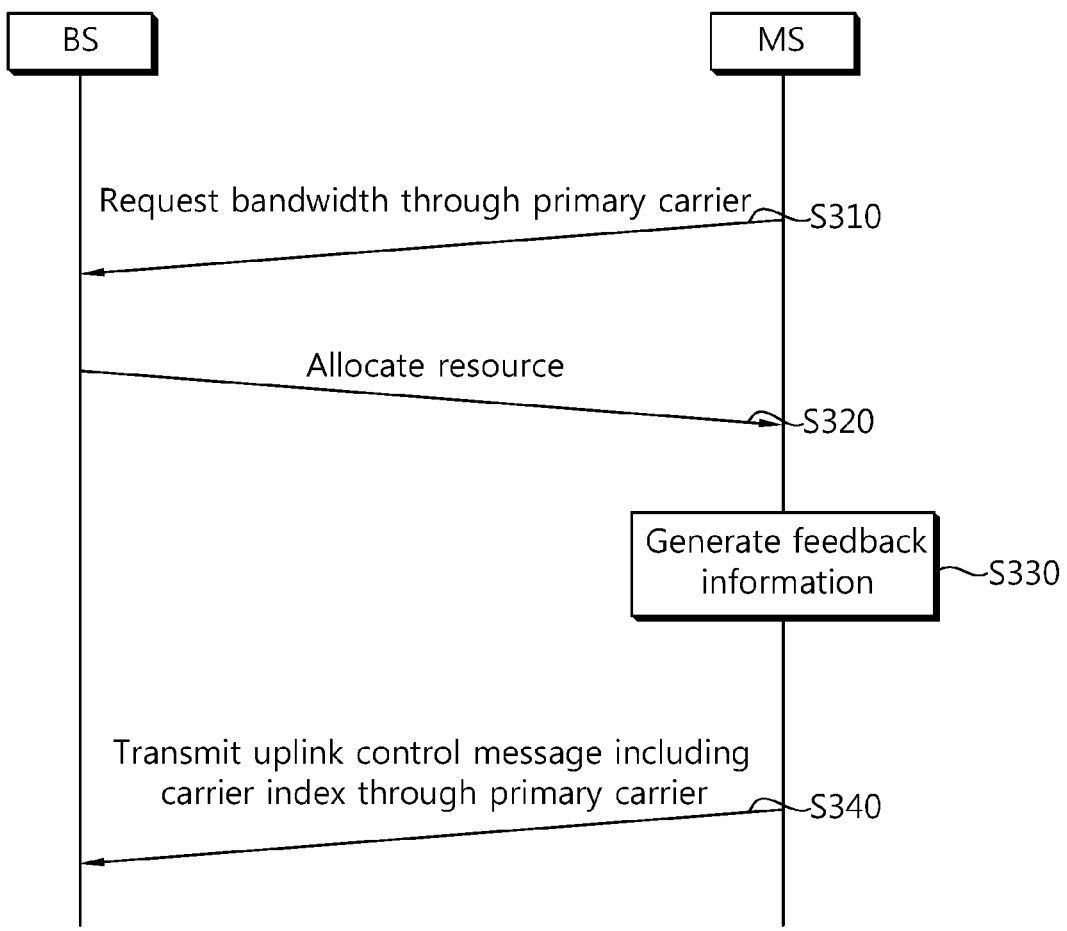
FIG. 7 is a flow chart illustrating the process of including carrier information in an uplink control channel and transmitting the same.

FIG. 7 shows another example in which carrier information is included in an uplink control channel and transmitted.

With reference to FIG. 7, the MS transmits a bandwidth request (BR) to the BS (S310).

The MS receives resource allocation information from the BS in response to the BR (S320).

The MS generates feedback information (S330). In this case, the feedback information generated by the MS may be event-driven feedback information. The event-driven feedback information may be, for example, an AAI_UL_PSR message.

The MS transmits the feedback information including a carrier index, as an uplink control message to the BS (S340). The uplink control message may be transmitted through a primary carrier. The inclusion of the carrier index may mean that the feedback information itself may include the carrier index or the MAC signaling header indicating carrier information may be added, as described above.

Currently, IEEE 802.16m D7 standard stipulates that the BR of the MS should be performed always through a primary carrier. The MS transmits the uplink control message through resources allocated according to the BR, and in this case, when the uplink control message includes carrier information, the BS can recognize to which of carriers, the uplink control message is related.

If the uplink control message does not include carrier information, the MS may be allowed to perform BR through each carrier allocated thereto.

Figure 8:
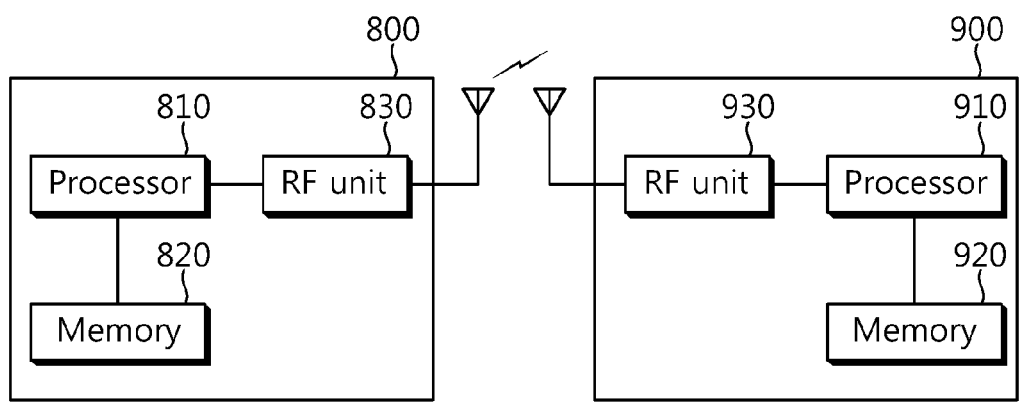
FIG. 8 is a schematic block diagram showing a BS and an MS according to an exemplary embodiment of the present invention.

FIG. 8 is a schematic block diagram showing a BS and an MS according to an exemplary embodiment of the present invention.

A BS 800 includes a processor 810, a memory 820, and an RF unit 830. The processor 810 implements the proposed function, process and/or method. The processor 810 supports a multi-carrier operation, and may allocate a plurality of carriers to an MS and manage and control it. The processor 810 may transmit a downlink control message including carrier information to the MS. The generated downlink control message is transmitted through the RF unit 830. Layers of a radio interface protocol may be implemented by the processor 810. The memory 820, connected to the processor 810, stores various types of information for driving the processor 810. The RF unit 830, connected to the processor 810, transmits and/or receives a radio signal, and transmits the feedback polling A-MAP IE.

The MS 900 includes a processor 910, a memory 920, and an RF unit 930. The RF unit 930 is connected to the processor 910. The processor 910 may receive a downlink control message from the BS through the RF unit 930, generate feedback information, and feeds it back through a primary carrier. Also, the processor 910 may generate a MAC control message and transmit it to the BS. In this case, the MAC control message may include carrier information such as a physical index with respect to a related carrier. Layers of a radio interface protocol may be implemented by the processor 910. The memory 920, connected to the processor 910, stores various types of information for driving the processor 910.

The processors 810 and 910 may include an ASIC (application-specific integrated circuit), a different chip-set, a logical circuit and/or a data processing device. The memories 820 and 920 may include ROM (read-only memory), RAM (random access memory), a flash memory, a memory card, a storage medium and/or a different storage device. The RF units 830 and 930 may include a baseband circuit for processing a radio signal. When an embodiment is implemented by software, the foregoing schemes may be implemented by modules (processes, functions, etc.) for performing the foregoing functions. The modules may be stored in the memories 820 and 920 and executed by the processors 810 and 910. The memories 820 and 920 may exist within or outside of the processors 810 and 910 and may be connected to the processors 810 and 910 through various well-known units.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for transmitting feedback of a mobile station (MS) in a wireless communication system supporting a multi-carrier operation, the method comprising:
   receiving a downlink control message unicasted from a base station (BS), wherein the downlink control message comprises a first physical carrier index indicating a relevant active carrier with which the downlink control message is associated;
   generating a feedback message based on a measurement involving the active carrier; and
   transmitting the feedback message to the BS as a response to the downlink control message,
   wherein the feedback message comprises a second physical carrier index indicating a relevant active carrier with which the feedback message is associated, and
   wherein the relevant active carrier indicated by the first physical carrier index is the same as the relevant active carrier indicated by the second physical carrier index.

2. The method of claim 1, wherein the downlink control message is transmitted through a media access control (MAC) control message and the feedback message is transmitted through a MAC control message.

3. The method of claim 1, wherein the downlink control message is a message instructing the MS to measure at least one of an SINR (signal to interference plus noise ratio) and downlink interference with respect to a particular frequency partition or a message used to configure the MS uplink power state reporting regarding the relevant active carrier with which the downlink control message is associated.

4. The method of claim 1, wherein the downlink control message is received through a primary carrier, wherein the primary carrier is a stand-alone carrier by which the MS performs an initial network entry process or a network re-entry process.

5. The method of claim 1, wherein each of the first physical carrier index and the second physical carrier index is comprised of 6 bits.

6. The method of claim 1, wherein the feedback message is transmitted through the primary carrier, and primary carrier is a stand-alone carrier by which the MS performs an initial network entry process or a network re-entry process.

7. The method of claim 1, wherein the feedback message comprises information obtained by measuring at least one of the SINR (signal to interference plus noise ratio) and downlink interference with respect to a particular frequency partition, information regarding the reporting of the uplink power state, or feedback information according to a MIMO (multi input multi output) feedback mode, regarding the relevant active carrier with which the feedback message is associated.

8. The method of claim 1, wherein the feedback message is event-driven message transmitted when particular conditions are met.

9. An apparatus for transmitting feedback in a wireless communication system supporting a multi-carrier operation, the apparatus comprising:
   an RF unit configured to transmit and receive a radio signal; and
   a processor connected to the RF unit,
   wherein the processor is configured to:
   receive a downlink control message unicasted from a base station (BS), wherein the downlink control message comprises a first physical carrier index indicating a relevant active carrier with which the downlink control message is associated;
   generate a feedback message based on a measurement involving the active carrier; and
   transmit the feedback message to the BS as a response to the downlink control message,
   wherein the feedback message comprises a second physical carrier index indicating a relevant active carrier with which the feedback message is associated, and
   wherein the relevant active carrier indicated by the first physical carrier index is the same as the relevant active carrier indicated by the second physical carrier index.

10. The apparatus of claim 9, wherein each of the first physical carrier index and the second physical carrier index is comprised of 6 bits.

* * * * *